UNITED STATES PATENT OFFICE.

FRANS RICHARD ALEXANDER SUNDELL, OF STOCKHOLM, SWEDEN.

METHOD OF AND COMPOSITION FOR PRODUCING IMITATION STONE OR WOOD, &c.

SPECIFICATION forming part of Letters Patent No. 607,095, dated July 12, 1898.

Application filed July 26, 1897. Serial No. 645,934. (No specimens.) Patented in Sweden September 13, 1893, No. 4,965.

*To all whom it may concern:*

Be it known that I, FRANS RICHARD ALEXANDER SUNDELL, sculptor, a subject of the King of Sweden, and a resident of Stockholm, in the Kingdom of Sweden and Norway, have invented certain new and useful Improvements in Methods of Producing Imitations of Different Kinds of Stone or Wood and the Like and Composition of Matter for the Same, (for which I have obtained a patent in Sweden, No. 4,965, bearing date September 13, 1893,) of which the following is a specification.

This invention relates to a method of and composition for imitating in a very striking manner different kinds of wood and mineral materials—for instance, of the latter, marble, onyx, porphyry, &c. The imitations may be produced in the shape of plane or curved plates, moldings, ornaments, &c. It is apparent, however, that the articles produced need not be made to imitate natural objects, since they may be given a surface in one color or provided with a fancy pattern or, briefly, with any desired design.

The invention is carried out as follows: Cement or plaster-of-paris, or both of these materials, if desired, with the addition of from twelve and one-half to ten per cent. of albolith, are mixed with from twelve and one-half to six and one-quarter per cent. of slaked lime, (the parts being taken by weight,) water, and a glutinous substance, preferably Cologne glue, in solution, one or more coloring-matters being added to the mixture as a whole or to different portions thereof. Water is to be taken in sufficient quantity to give to the whole the consistency of gruel or pulp. By the term "cement" I refer to those substances which when mixed with water harden so as to form a stone-like mass, having a greater hardness and tenacity than common mortar and usually termed "hydraulic cement." The albolith used is made from magnesite, (a native carbonate of magnesium,) which is ground and sifted and then mixed with a certain quantity of amorphous silicic acid. The coloring-matter best suited for the purpose are ground mineral colors, though other coloring-matter may be employed. The only colors to be used, however, are those which will not fade. The various ingredients may be mixed in all at once or successively.

Of the mass thus prepared a quantity of one or several colors is spread out over an even horizontal surface or poured into a mold, this operation being carried out without any greasing or oiling whatever of the surface of the mold, and neither need hot nor cold water be used for the removing of the product from the mold. If it is desired to imitate a mineral, for instance, or some kind of wood, suitably-colored portions of the mass are chosen and spread out over the surface, suitable expedients—such as sponges, brushes, &c.—being employed for the intermingling of the variously-colored portions, so as to produce the marbling, graining, &c., required. After the distribution and mixing of the colors there is sifted or sprinkled over the surface some dry gypsum or cement, or both, if wanted, with the addition of one-eighth or one-sixteenth part of slaked lime, whereupon the whole is left intact for from five to thirty minutes. The whole surface is then covered with a mass of the same composition as that first used. No coloring-matter need, however, be mixed into this mass, since it is the back side of the article which is produced in this operation. The whole is then sifted over as before. On allowing the mass to remain intact for some time (from two to twenty minutes) the whole piece is pressed, stamped, or pounded with wooden mallets, for instance, for the purpose of giving increased coherence to the product. When the piece thus produced has dried partly, it can be taken up and placed to dry still further in the air, or it may be dried by any usual means. Articles produced in this manner require no grinding and in many cases no polishing, the surfaces by the mixing process and treatment above described being directly made to appear smooth and very glossy.

In order to produce plates or other objects of greater strength, the whole surface should after the second sifting operation be covered with some woven material, wire-netting being best suited for the purpose, though textile materials may answer. Said woven material may be applied in one piece or in pieces of large or small size.

Having now described my invention, what I claim as new, and desire to secure by Letters Patent, is—

1. The method of producing imitations of minerals and wood consisting in forming the body portion of a mixture of cement and slaked lime, water containing a glutinous substance in solution and albolith, spreading out said mass, sprinkling the surface with a dry mixture of cement and slaked lime, then covering the surface with a mass of material of the same composition as that forming the body and again sprinkling the surface with a dry mixture of cement and slaked lime, pressing the mass, and allowing the same to dry, substantially as described.

2. The herein-described composition imitating mineral or wood substances consisting of a mixture of cement, slaked lime, a glutinous substance and albolith, substantially as described.

In witness whereof I have hereunto signed my name in the presence of two subscribing witnesses.

FRANS RICHARD ALEXANDER SUNDELL.

Witnesses:
   ERNST SVANQVIST,
   HANS B. OHLSSON.